(12) United States Patent
Packham et al.

(10) Patent No.: US 10,678,880 B2
(45) Date of Patent: Jun. 9, 2020

(54) DIGITAL KEY DISTRIBUTION MECHANISM

(71) Applicant: GREENMAN GAMING LIMITED, London (GB)

(72) Inventors: Lee Packham, London (GB); Krzysztof Bandurski, London (GB); James Phillips, Basingstoke (GB); Daniel Smedley, Thames Ditton (GB)

(73) Assignee: Greenman Gaming Limited, London (GB)

(*) Notice: Subject to any disclaimer, the term of this patent is extended or adjusted under 35 U.S.C. 154(b) by 292 days.

(21) Appl. No.: 14/820,970

(22) Filed: Aug. 7, 2015

(65) Prior Publication Data

US 2016/0044130 A1 Feb. 11, 2016

Related U.S. Application Data

(60) Provisional application No. 62/034,444, filed on Aug. 7, 2014.

(51) Int. Cl.
*H04L 29/06* (2006.01)
*G06F 16/957* (2019.01)

(52) U.S. Cl.
CPC ........ *G06F 16/9574* (2019.01); *H04L 63/064* (2013.01)

(58) Field of Classification Search
CPC ................ G06F 17/30902; H04L 63/064
See application file for complete search history.

(56) References Cited

U.S. PATENT DOCUMENTS

| | | | |
|---|---|---|---|
| 7,823,190 B1 | 10/2010 | Kacarov et al. | |
| 9,876,991 B1* | 1/2018 | Ray | H04N 7/1675 |
| 2005/0091511 A1* | 4/2005 | Nave | G06F 8/61 |
| | | | 713/185 |
| 2006/0210084 A1* | 9/2006 | Fransdonk | G06Q 20/12 |
| | | | 380/278 |
| 2010/0251346 A1* | 9/2010 | Dumais | G06F 21/10 |
| | | | 726/5 |
| 2010/0293536 A1* | 11/2010 | Nikitin | G06F 21/105 |
| | | | 717/168 |
| 2010/0319072 A1* | 12/2010 | Abzarian | G06F 21/10 |
| | | | 726/31 |
| 2011/0004758 A1* | 1/2011 | Walker | H04L 63/062 |
| | | | 713/168 |

(Continued)

OTHER PUBLICATIONS

GB Search Report dated Feb. 5, 2016 in GB Application No. 1414035.4 (1 page).

*Primary Examiner* — Sargon N Nano
*Assistant Examiner* — Kidest Mendaye
(74) *Attorney, Agent, or Firm* — Nixon & Vanderhye P.C.

(57) ABSTRACT

The present invention relates to a method for distributing digital keys. The method includes the steps of a first database storing a plurality of keys relating to a plurality of products; for each product, transferring keys from the first database to a corresponding cache in a second database; in response to a request for a key for a product, retrieving and distributing a key from the corresponding cache; and refreshing the corresponding cache by transferring further keys from the first database to the corresponding cache. A system for distributing digital keys is also disclosed.

22 Claims, 8 Drawing Sheets

(56) References Cited

U.S. PATENT DOCUMENTS

| | | | | |
|---|---|---|---|---|
| 2011/0010298 A1* | 1/2011 | Robert | ............... | G06Q 10/06 |
| | | | | 705/59 |
| 2011/0125745 A1* | 5/2011 | Bright | ............... | G06F 16/217 |
| | | | | 707/737 |
| 2011/0213967 A1* | 9/2011 | Wnuk | ............... | H04L 63/0823 |
| | | | | 713/158 |
| 2011/0269437 A1* | 11/2011 | Marusi | ............... | G06F 16/9577 |
| | | | | 455/414.1 |
| 2013/0198085 A1* | 8/2013 | Li | ............... | G06F 21/105 |
| | | | | 705/59 |
| 2014/0108593 A1* | 4/2014 | O'Connor | ............... | G06F 8/60 |
| | | | | 709/217 |
| 2015/0013014 A1* | 1/2015 | Daniel | ............... | G06F 21/10 |
| | | | | 726/27 |

* cited by examiner

DIGITAL KEY DISTRIBUTION MECHANISM

This application claims the benefit of U.S. Provisional Application No. 62/034,444 filed Aug. 7, 2014, the entire content of which is hereby incorporated by reference.

FIELD OF INVENTION

The present invention is in the field of digital key distribution. More particularly, but not exclusively, the present invention relates to distribution of digital keys from a server to multiple requesters.

BACKGROUND

Keys are unique codes that can be used to provide authorisations for digital products, such as software or digital content, or for hardware products.

These keys can be provided to customers via a printed mechanism where the customer obtains a physical copy of the printed code, or as digital keys via an electronic mechanism where the customer is emailed the code or where the code is provided directly to the customer's device for use by the digital product delivery system.

In one particular key distribution system, keys are obtained from a plurality of providers and electronically distributed to a plurality of customers. One example of this system is the provision of downloadable games via an e-commerce platform.

For this system, the keys are typically stored within a table within a database and when a customer requests a particular digital product, a relevant key is removed from the table and sent to the customer.

However, this mechanism has a number of disadvantages particularly where there are a large number of digital products and a high frequency of customer requests. In this situation, multiple requests made to a single table within the database will result in customers being put into a queue and/or, potentially, result in an unreliable database system with some keys being distributed multiple times or not at all. This results in slow and/or error prone delivery of the keys to customers.

Furthermore, when keys are being provided by multiple providers into the distribution system, keys can be provided from these providers in a haphazard manner and some keys may need to be revoked from the system by a provider. To add or revoke keys to/from a table means that the table must be locked for access. Once a lock is placed on the table, customers are queued to wait for their keys. This results in a database system which is unable to provide reliable and real-time delivery of data (in this instance, delivery of keys to customers).

It is an object of the present invention to provide a digital key distribution system which overcomes the disadvantages of the prior art, or at least provides a useful alternative.

SUMMARY OF INVENTION

According to a first aspect of the invention there is provided a computer-implemented method for distributing digital keys, including:
 a) a first database storing a plurality of keys relating to a plurality of products;
 b) for each product, a server transferring keys from the first database to a corresponding cache in a second database;
 c) in response to a request for a key for a product, a server retrieving and distributing a key from the corresponding cache; and
 d) refreshing the corresponding cache by a server transferring further keys from the first database to the corresponding cache.

The products may be digital products, such as software, games, movies, music, or any other digital product.

Further keys for a product may be transferred from the first database to a corresponding cache when the number of keys in the cache falls below a minimum threshold. When the number of keys in the cache falls below a minimum threshold, keys may be transferred from the first database to the cache up to a maximum threshold for the cache. The minimum and/or maximum threshold may be predefined. A separate maximum and/or minimum threshold may be predefined for each cache. Alternatively, the same maximum and/or minimum threshold may be predefined for every cache.

Further keys for a product may be transferred from the first database to the corresponding cache periodically.

Keys stored within the first database may be assigned a priority. The priority may determine the order in which the keys are transferred to their corresponding cache.

The method of the first aspect may further include the step of: revoking a key within the first database by marking the key as revoked such that revoked keys are not transferred to their corresponding cache.

The plurality of products may relate to a plurality of providers.

When a key is distributed from a cache, the key may be popped from the cache.

When keys are transferred from the first database to the second database, the keys may be marked within the first database as used.

Keys may be stored within the first database within a group for each product.

Keys may be provided in batches to the first database to be stored. Keys stored within the first database may be associated by batch.

According to a further aspect of the invention there is provided a system for distributing keys, including:
 One or more servers;
 a first database; and
 a second database;
 wherein the system is configured to perform the method of the first aspect.

The system may further include a plurality of requester apparatuses configured to request a key for a product and to receive the requested key from the server.

Other aspects of the invention are described within the claims.

BRIEF DESCRIPTION OF THE DRAWINGS

Embodiments of the invention will now be described, by way of example only, with reference to the accompanying drawings in which.

DETAILED DESCRIPTION OF PREFERRED EMBODIMENTS

The present invention provides a method and system for distributing digital keys.

Figure 1:
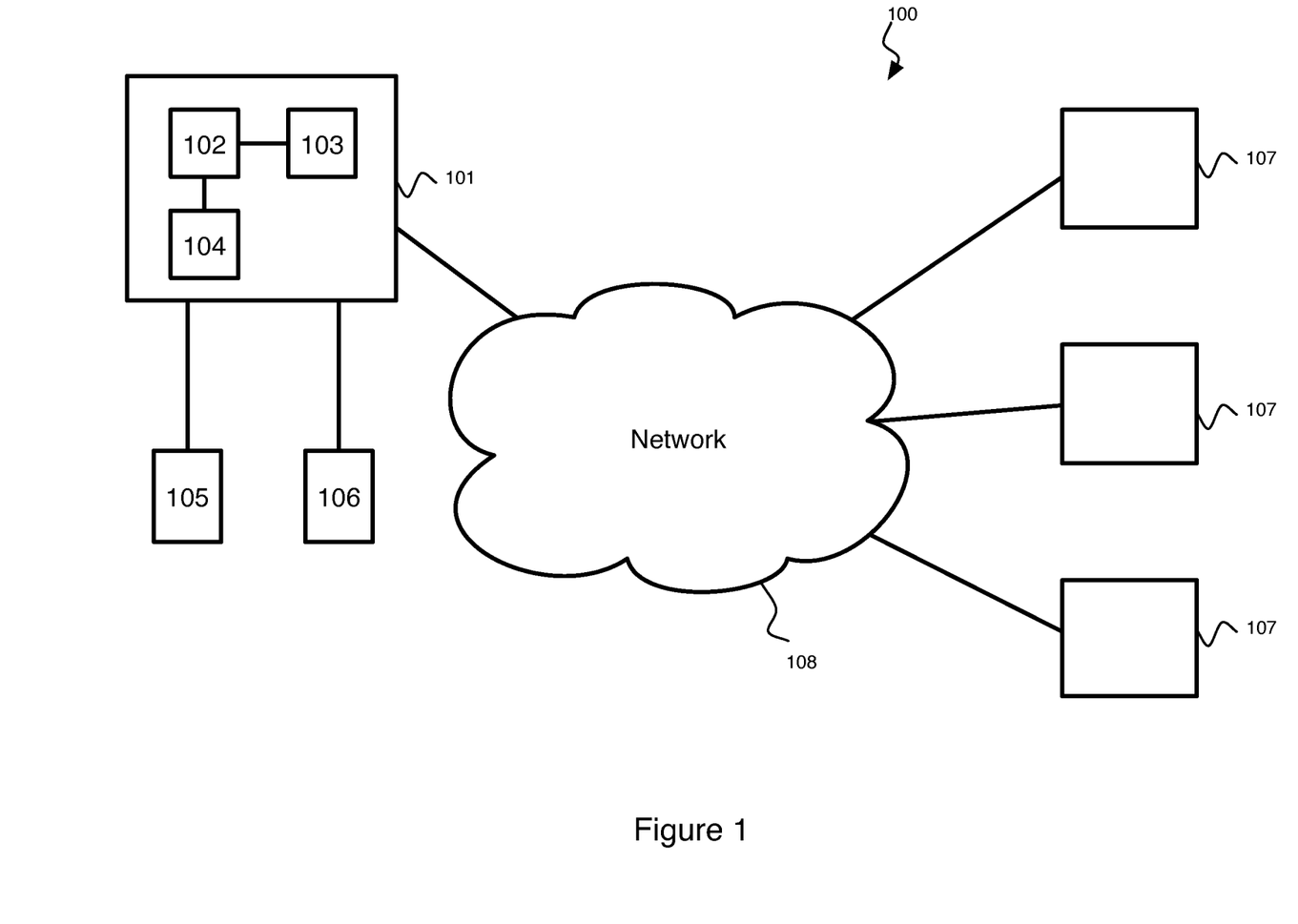
FIG. 1: shows a block diagram of a system in accordance with an embodiment of the invention.

In FIG. 1, a system 100 in accordance with an embodiment of the invention is shown.

A server 101 is shown. The server 101 comprises a processor 102, a memory 103, and a communications module 104. The server 101 is connected to a first database 105 and a second database 106.

A plurality of apparatuses 107 is shown. Each apparatus 107 is configured to communicate with the server 101 via a communications network 108.

The first database 105 is configured to store a plurality of keys for a plurality of products.

The second database 106 is configured to store a cache of keys for each product.

The server 101 is configured to receive requests from the plurality of apparatuses 107 for a key for a product, to retrieve the key from the corresponding cache within the second database 106, and to transmit the key to the requesting apparatus 107.

The server 101 is further configured to refresh the cache for a product with replacement keys from the first database 105.

It will be appreciated that the functions of the server 101 may be split across a plurality of computing apparatus. For example, one separate apparatus may be configured for receiving and fulfilling requests from the plurality of apparatuses 107 and a different apparatus may be configured for refreshing the cache.

Figure 2:
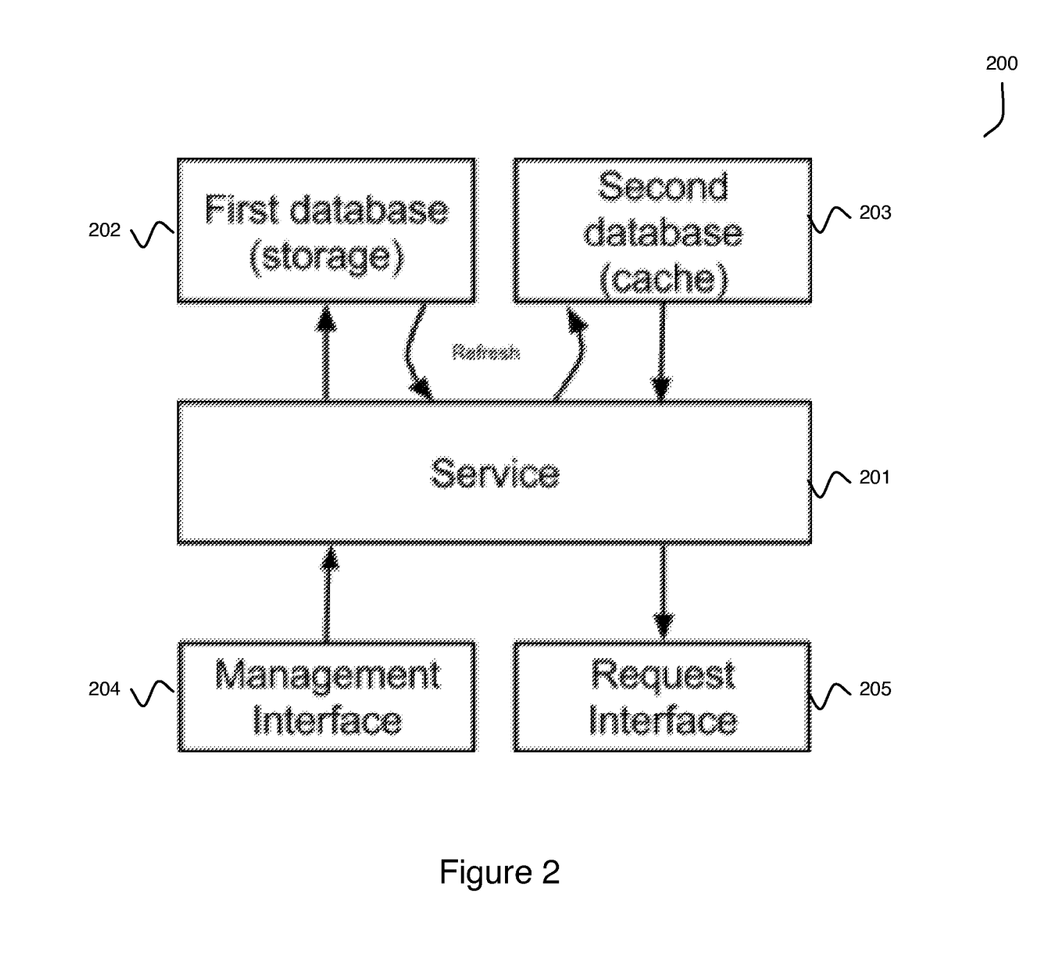
FIG. 2: shows a block diagram of a server architecture in accordance with an embodiment of the invention.

In FIG. 2, the architecture of a server 200 in accordance with an embodiment of the invention is shown.

The server 200 comprises a service 201 which is configured to manage the first and second databases 202 and 203. The server 200 includes a management interface 204 for the service 201 and a request interface 205 for the service 201.

The management interface 204 is configured to provide for new keys to be added and keys to be revoked. The management interface 204 may be provided, for example, via Thrift. Thrift is a known interface definition language and binary communication protocol is used to define and create services for numerous languages. The management interface 204 may also be configured to enable keys to be extracted, for example, to distribute the keys via an alternate method.

The request interface 205 is configured to receive requests from apparatus 107 for keys. The request interface 205 may be provided via HTTP.

It will be appreciated that, although reference to specific technologies is made, alternate technologies may be used in place.

Figure 3:
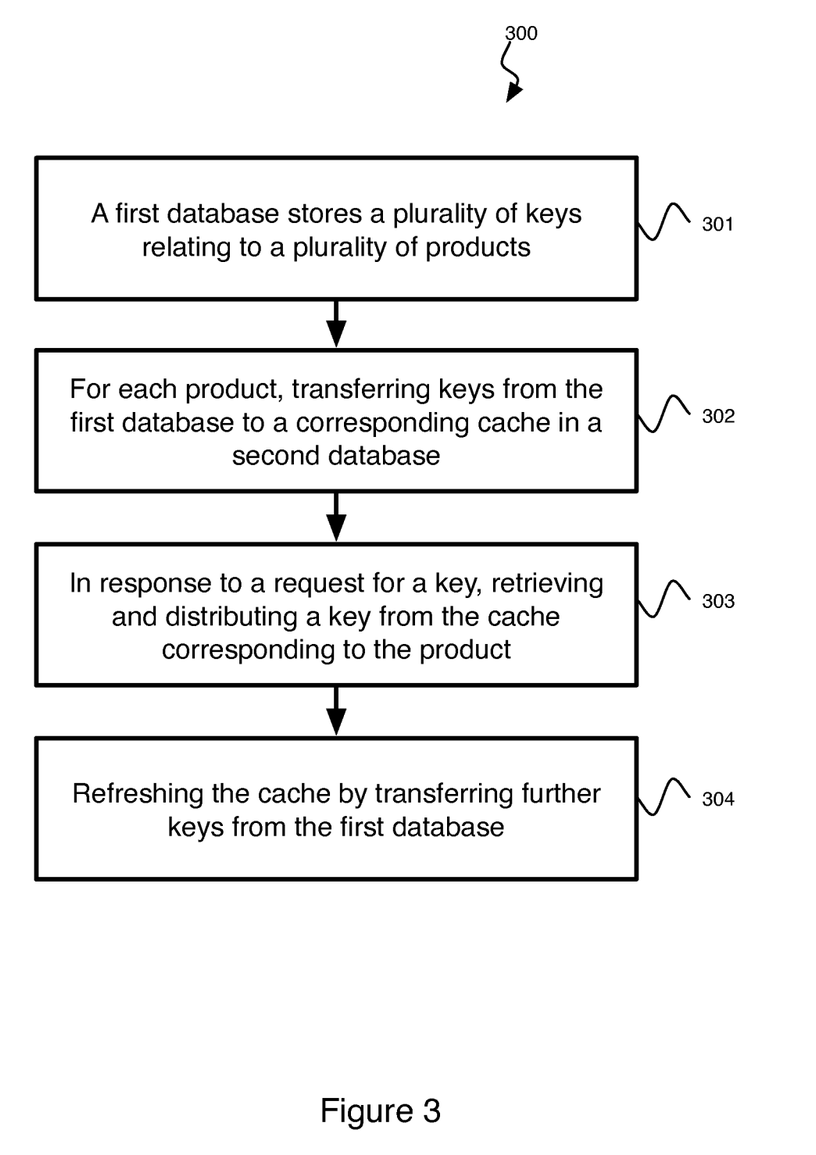
FIG. 3: shows a flow diagram of a method in accordance with an embodiment of the invention.

With reference to FIG. 3, a method 300 in accordance with an embodiment of the invention will be described.

In step 301, a first database stores a plurality of keys relating to a plurality of products. The products may be digital products, and may be from a plurality of providers. The keys, in turn, may have been supplied to the system from the plurality of providers. The keys may be stored within the first database by product in a group called a keygroup.

In step 302, for each product, keys are transferred from the first database to a corresponding cache in a second database. The keys may be transferred up to a maximum threshold which may be defined as the same threshold for all the caches or may be defined on a per cache basis.

In step 303, in response to a request for a key for a product, retrieving and distributing a key from the corresponding cache. The key may be "popped" (i.e. deleted) from the cache. The request may be made via the request interface.

In step 304, refreshing the corresponding cache by transferring further keys from the first database to the corresponding cache.

The cache for a product may be refreshed if the number of keys falls below a predefined update threshold. A possible advantage of this feature is that it prevents the cache running out of keys and resulting in a request generating a hit on the first database.

In an alternative embodiment, the caches are periodically refreshed. A possible advantage of this feature is that it may make transfers predictable.

During the refresh, keys may be transferred up to the maximum threshold for that cache.

New keys may be added to the first database (i.e. key injection), for example via the management interface. The keys within the first database may be stored in groups for each product. Keys may be stored with a priority. The priority may determine the order in which keys are transferred to the cache. For example, keys with a higher priority may be transferred before keys with a lower priority. Keys may be added to the first database in batches, and the keys may be associated with their batch within the first database.

Keys may be revoked, for example, via the management interface. If revoked, a key may be marked or flagged within the first database as "revoked"; such a key will not be transferred to a corresponding cache. Keys may be revoked individually or by batches.

Figure 4:
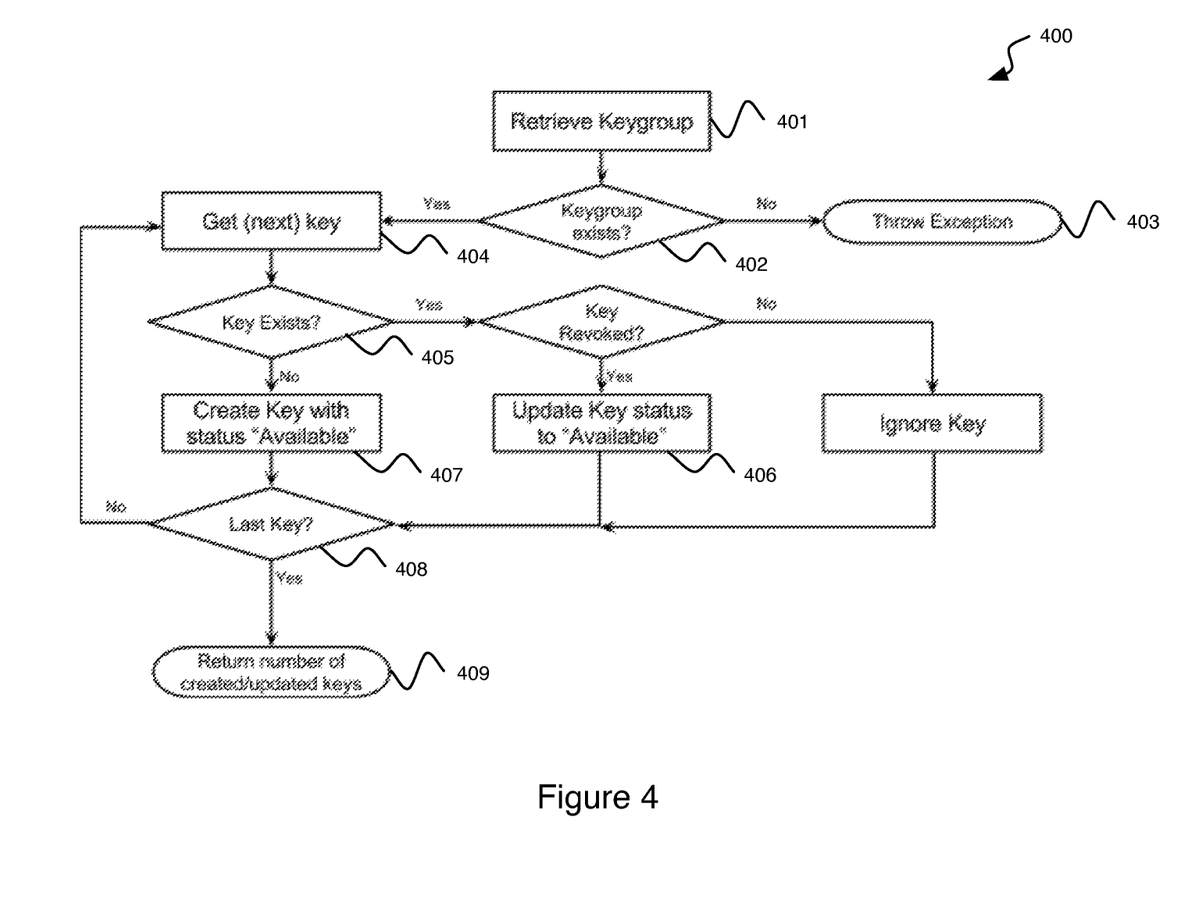
FIG. 4: shows a flow diagram of a key injection method in accordance with an embodiment of the invention.

In relation to FIG. 4, an exemplary key injection process 400 will be described.

In this example, a list of keys, to supply future requests for keys, is inserted into the system by an entity, such as a provider or user of the management interface.

A keygroup for a digital product is retrieved 401 from the first database via the management interface.

In step 402, if the keygroup does not exist an exception is thrown 403. Otherwise, a key is obtained 404 from a list of keys to insert into the first database.

In step 405, if this key already exists, and the key is revoked then the status of the key is updated 406 to "available".

If the key does not exist, a key is created 407 within the first database with the status "available".

In step 408, the process is repeated until the last key has been injected.

The number of created or updated keys is returned 409 to the entity.

Prioritisation of the keys may be provided during injection of keys into the first database.

Figure 5:
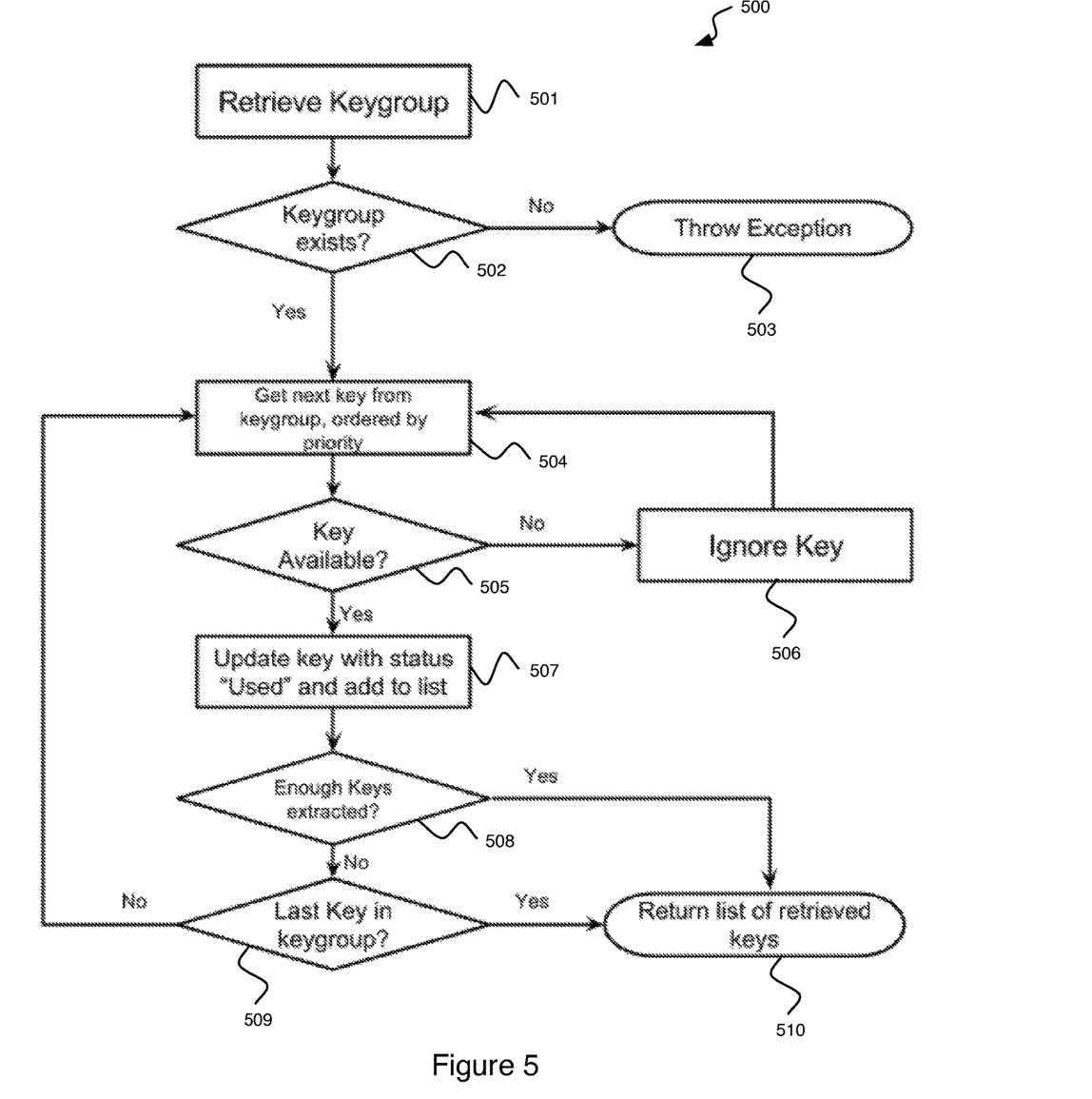
FIG. 5: shows a flow diagram of a key extraction method in accordance with an embodiment of the invention.

In relation to FIG. 5, an exemplary key extraction process 500 will be described.

In this example, a defined number of keys is to be extracted from the system upon request from an entity. This mechanism supplements the key request process (described in relation to FIG. 8), which may be useful if a large set of keys is required by a single requester.

A keygroup for a digital product is retrieved 501 from the first database via the management interface.

In step 502, if the keygroup does not exist an exception is thrown 503. Otherwise, a key is retrieved, in step 504, from the keygroup. The keys may be retrieved based upon priority order within the first database.

In step 505, if this key is not marked as "available", then the key is ignored 506 and the above step 504 is repeated.

Otherwise, the status of the key is updated to "used" and the key is added to a list in step 507.

In steps 508 and 509, the process is repeated until sufficient keys have been retrieved to meet the defined number or until there are no further keys within the keygroup.

The list of retrieved keys is returned 510 to the entity.

Figure 6:
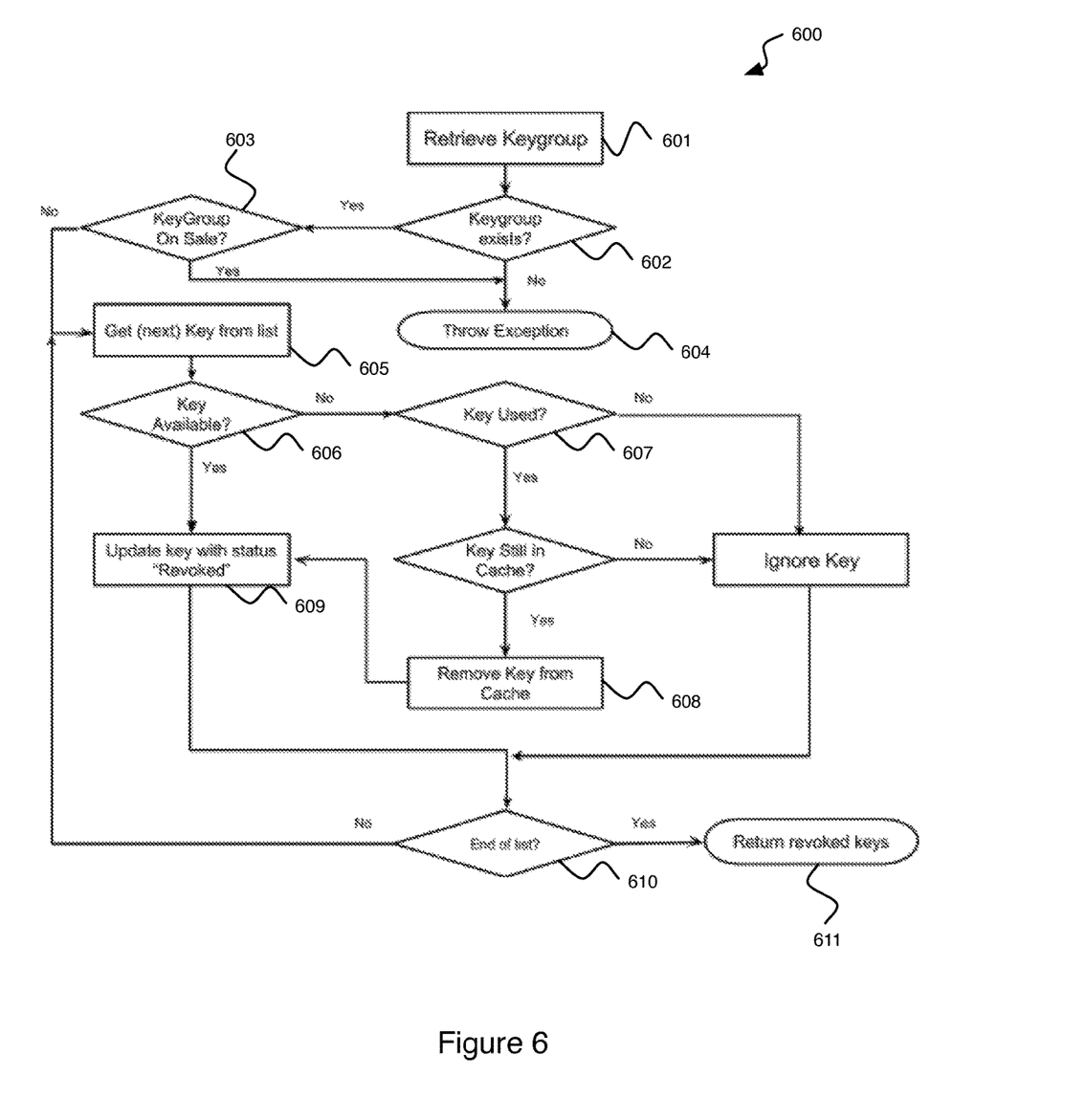
FIG. 6: shows a flow diagram of a key revocation method in accordance with an embodiment of the invention.

In relation to FIG. 6, an exemplary key revocation process 600 will be described.

In this example, a list of keys is to be revoked upon request by an entity.

A keygroup for a digital product is retrieved 601 from the first database via the management interface.

In steps 602 and 603, if the keygroup does not exist or if the keygroup is on sale, an exception is thrown 604. Otherwise, a key from the list is obtained 605 from the keygroup.

In steps 606 and 607, if this key is not marked as "available" and is marked as "used", then if the key is in the cache it is removed from the cache in step 608 and the key is updated with the status "revoked" in step 609.

If the key is marked as "available", then the key is updated with the status "revoked" in step 609.

In step 610, the process is repeated for every other key in the list, and then the total number of revoked keys is returned 611 to the entity.

In relation to FIG. 7, an exemplary key refresh process 700 will be described.

A keygroup for a digital product is retrieved 701 from the first database via the management interface.

During the refresh process, the keygroup within the first database may be locked to prevent multiple refresh processes occurring at the same time.

In step 702, if the keygroup does not exist, or if the keygroup is locked, an exception is thrown 703. Otherwise, a key is retrieved 704 from the keygroup. The keys may be retrieved based upon priority order within the first database.

In step 705, if this key is marked as "available", then the status of the key is updated to "used" and the key is added to the cache in step 706.

In step 707 and 708, the process is repeated until the desired number of keys has been cached or until the keygroup has been emptied of keys.

At the end of the process, if the keygroup was locked during the refresh process, it is unlocked.

Figure 8:
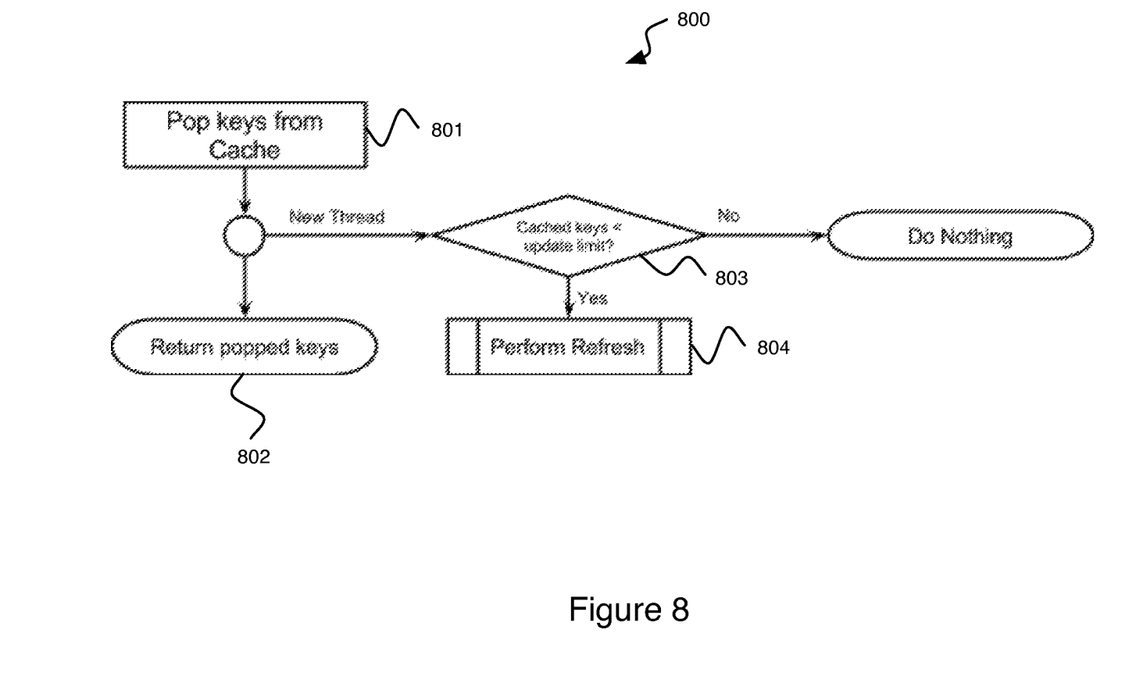
FIG. 8: shows a flow diagram of a key request method in accordance with an embodiment of the invention.

In relation to FIG. 8, an exemplary key request process 800 will be described.

In this example, a key is requested from the system by a requesting apparatus.

A key or keys are popped 801 from the cache corresponding to that digital product. This key or keys are returned 802 to the requesting apparatus.

Figure 7:
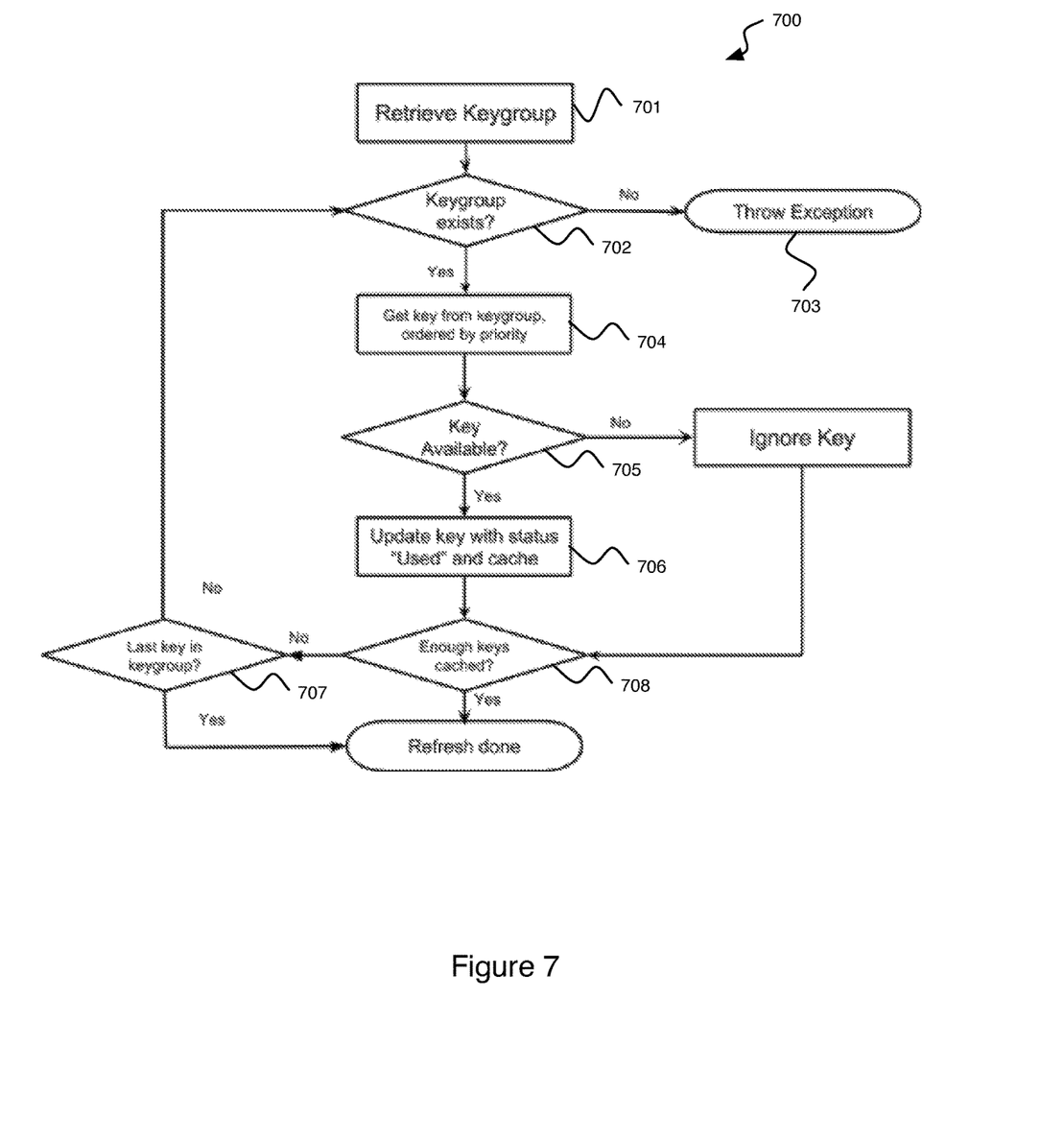
FIG. 7: shows a flow diagram of a key refresh method in accordance with an embodiment of the invention.

In this example, a new thread is created which checks to see, in step 803, if the cached keys are less than an update threshold (i.e. a minimum level), if so, a refresh is performed 804 as outlined in relation to FIG. 7.

It will be appreciated that different mechanisms can be used to monitor whether the cached keys are less than the update threshold. For example, a separate task within the server may monitor the cached keys and instruct or perform the refresh, or a separate computing apparatus, entirely, may monitor the cached keys and instruct or perform the refresh.

Potential advantages of some embodiments of the present invention are that keys can be transferred from a server to a requester when that server is under load, and keys can be deleted and inserted into a database on the server without impacting upon reliable and real-time delivery of keys to requesters. Therefore, embodiments of the present invention improve the reliability of a digital key distribution architecture for delivering keys from a source apparatus to a plurality of requester apparatuses.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of applicant's general inventive concept.

The invention claimed is:

1. A computer-implemented method for distributing digital unique product keys using a plurality of caches, including:
    a first database storing a plurality of product keys relating to a plurality of products;
    a server transferring product keys for each product of the plurality of products from the first database to a corresponding cache of the plurality of caches in a second database, wherein each product corresponds to only one cache of the plurality of caches and each cache stores a plurality of product keys for only the product corresponding to the cache;
    in response to a request for a product key for a product, the server retrieving and distributing the product key from the corresponding cache for the product for which the product key is requested; and
    after distributing the product key from the corresponding cache for the product for which the product key is requested, deleting the distributed product key from the corresponding cache and refreshing the corresponding cache by the server transferring one or more further product keys from the first database to the corresponding cache,
    wherein the product keys stored within the first database are assigned a priority; and
    the priority determines the order in which the product keys are transferred to their corresponding cache.

2. The method as claimed in claim 1, wherein the products are digital products.

3. The method as claimed in claim 1, wherein further product keys for the product are transferred from the first database to the corresponding cache when the cache falls below a minimum threshold.

4. The method as claimed in claim 3, wherein the minimum threshold is predefined.

5. The method as claimed in claim 1, wherein, when the cache for the product falls below a minimum threshold, transferring product keys from the first database to the cache up to a maximum threshold for the cache.

6. The method as claimed in claim 1, wherein further product keys for the product are transferred from the first database to the corresponding cache periodically.

7. The method as claimed in claim 1, further including: revoking a second product key within the first database by marking the second product key as revoked;
wherein revoked product keys are not transferred to their corresponding cache.

8. The method as claimed in claim 1, wherein the plurality of products relate to a plurality of providers.

9. The method as claimed in claim 1, wherein, when the product key is distributed from the cache, the product key is popped from the cache.

10. The method as claimed in claim 1, wherein the maximum threshold is predefined.

11. The method as claimed in claim 10, wherein a separate maximum threshold is predefined for each cache.

12. The method as claimed in claim 10, wherein the same maximum threshold is predefined for every cache.

13. The method as claimed in claim 1, wherein, when product keys are transferred from the first database to the second database, the product keys are marked within the first database as used.

14. The method as claimed in claim 1, wherein product keys are stored within the first database within a group for each product.

15. The method as claimed in claim 1, wherein product keys are provided in batches to the first database to be stored.

16. The method as claimed in claim 1, wherein product keys are stored within the first database are associated by batch.

17. A system for distributing digital unique product keys, including: one or more servers;
a first database; and
a second database;
wherein the system is configured to:
store in the first database a plurality of product keys relating to a plurality of products;
transfer product keys for each product of the plurality of products from the first database to a corresponding cache of a plurality of caches in the second database, wherein each product corresponds to only one cache of the plurality of caches and each cache stores a plurality of product keys only for the product corresponding to the cache;
in response to a request for a product key for a product, retrieve and distribute the product key from the corresponding cache for the product for which the product key is requested; and
after distributing the product key from the corresponding cache for the product for which the product key is requested, deleting the distributed product key from the corresponding cache and refreshing the corresponding cache by the server transferring one or more further product keys from the first database to the corresponding cache;
wherein the product keys stored within the first database are assigned a priority; and
the priority determines the order in which the keys are transferred to their corresponding cache.

18. The system as claimed in claim 17, further including a plurality of requester apparatuses configured to request a product key for a product and to receive the requested product key from the server.

19. A system for distributing digital unique product keys for a plurality of products, the system comprising a processing system configured to:
store in a first database a plurality of product keys relating to a plurality of products; transfer product keys for each product of the plurality of products from the first database to a respective cache of a plurality of caches in a second database associated with the respective products, wherein each cache of the plurality of caches is only associated with a different product of the plurality of products and stores a plurality of product keys only for the associated product;
in response to a request from an apparatus for a product key of a product associated with the apparatus, retrieve a product key from the cache associated with the requested product and transmit the retrieved product key to the apparatus making the request; and
after transmitting the retrieved product key to the apparatus, delete the retrieved product key from the cache and transfer, from the first database, one or more further product keys to the cache from which the retrieved product key is deleted;
wherein the product keys stored within the first database are assigned a priority; and
the priority determines the order in which the keys are transferred to their corresponding cache.

20. The system of claim 19, wherein the one or more further product keys are transferred to the cache only after a number of product keys stored in the cache falls below a set threshold.

21. The system of claim 19, wherein each cache of the plurality of caches is periodically updated to replace product keys retrieved from the plurality of caches.

22. The system of claim 19, wherein each cache of the plurality of caches stores a predetermined number of keys which is the same for each cache of the plurality of caches.

* * * * *